United States Patent
Morgan et al.

(10) Patent No.: US 9,890,712 B2
(45) Date of Patent: Feb. 13, 2018

(54) METHOD AND APPARATUS FOR POWER STORAGE

(75) Inventors: Robert Morgan, West Sussex (GB); Stuart Nelmes, Reigate (GB); Nicola Castellucci, Woking (GB); Stephen Gareth Brett, Reading (GB)

(73) Assignee: Highview Enterprises Limited, London (GB)

( * ) Notice: Subject to any disclaimer, the term of this patent is extended or adjusted under 35 U.S.C. 154(b) by 866 days.

(21) Appl. No.: 14/343,180

(22) PCT Filed: Sep. 6, 2012

(86) PCT No.: PCT/GB2012/052189
§ 371 (c)(1),
(2), (4) Date: Apr. 23, 2014

(87) PCT Pub. No.: WO2013/034908
PCT Pub. Date: Mar. 14, 2013

(65) Prior Publication Data
US 2014/0245756 A1    Sep. 4, 2014

(30) Foreign Application Priority Data
Sep. 6, 2011    (GB) .................................. 1115336.8

(51) Int. Cl.
*F25J 1/00*    (2006.01)
*F02C 6/14*    (2006.01)
(Continued)

(52) U.S. Cl.
CPC .................. *F02C 6/16* (2013.01); *F01K 3/00* (2013.01); *F02C 1/04* (2013.01); *F02C 6/14* (2013.01);
(Continued)

(58) Field of Classification Search
CPC ........ F25J 1/0012; F25J 1/0045; F25J 1/0035; F25J 1/0037; F25J 1/0228; F25J 1/0234;
(Continued)

(56) References Cited

U.S. PATENT DOCUMENTS 6,920,759 B2    7/2005    Wakana et al.
8,627,665 B2 *    1/2014    Ruer .......................... F01K 3/12
                                                                                    60/650

(Continued)

FOREIGN PATENT DOCUMENTS

EP    2236822 A1    10/2010
FR    2489411 A1    3/1982
(Continued)

OTHER PUBLICATIONS

"Storage of Electrical Energy Using Supercritical Liquid Air" by E.M. Smiith, Thermodynamics and Fluid Mechanics Group, pp. 289-298 and Discussion D57-D65.*
(Continued)

*Primary Examiner* — Keith Raymond
(74) *Attorney, Agent, or Firm* — Thomas B. Ryan, Patent Agent; Harter Secrest & Emery LLP

(57) ABSTRACT

Cryogenic energy storage systems, and particularly methods for capturing cold energy and re-using that captured cold energy, are disclosed. The systems allow cold thermal energy from the power recovery process of a cryogenic energy storage system to be captured effectively, to be stored, and to be effectively utilized. The captured cold energy could be reused in any co-located process, for example to enhance the efficiency of production of the cryogen, to enhance the efficiency of production of liquid natural gas, and/or to provide refrigeration. The systems are such that the cold energy can be stored at very low pressures, cold energy can be recovered from various components of
(Continued)

the system, and/or cold energy can be stored in more than one thermal store.

13 Claims, 14 Drawing Sheets

(51) Int. Cl.
| | | |
|---|---|---|
| *F02C 6/16* | (2006.01) | |
| *F02C 7/10* | (2006.01) | |
| *F02C 1/04* | (2006.01) | |
| *F01K 3/00* | (2006.01) | |
| *F17C 7/04* | (2006.01) | |
| *F25J 1/02* | (2006.01) | |
| *F17C 7/02* | (2006.01) | |

(52) U.S. Cl.
CPC .................. *F02C 7/10* (2013.01); *F17C 7/02* (2013.01); *F17C 7/04* (2013.01); *F25J 1/004* (2013.01); *F25J 1/0012* (2013.01); *F25J 1/0035* (2013.01); *F25J 1/0037* (2013.01); *F25J 1/0045* (2013.01); *F25J 1/0202* (2013.01); *F25J 1/0228* (2013.01); *F25J 1/0251* (2013.01); *F25J 1/0264* (2013.01); *F25J 1/0288* (2013.01); *F25J 2205/24* (2013.01); *F25J 2210/06* (2013.01); *F25J 2235/02* (2013.01); *F25J 2240/90* (2013.01); *F25J 2270/06* (2013.01); *Y02E 60/142* (2013.01); *Y02E 60/145* (2013.01); *Y02E 60/147* (2013.01); *Y02E 60/15* (2013.01)

(58) Field of Classification Search
CPC ...... F25J 1/0235; F25J 1/0236; F25J 2205/24; F25J 2240/90; F25J 1/0251; F25J 1/0264; F25J 1/0265; F02C 6/14; F02C 6/16; F17C 7/02; F17C 7/04; Y02E 60/15; Y02E 60/14; Y02E 60/147
See application file for complete search history.

(56) References Cited

U.S. PATENT DOCUMENTS

| | | | |
|---|---|---|---|
| 2003/0101728 A1 | 6/2003 | Wakana et al. | |
| 2003/0157386 A1* | 8/2003 | Gottmann | H01M 8/04022 429/465 |
| 2008/0149597 A1* | 6/2008 | Plumhoff | G03F 1/80 216/67 |
| 2009/0282840 A1* | 11/2009 | Chen | F01D 15/005 62/50.3 |
| 2010/0251712 A1* | 10/2010 | Nakhamkin | F01K 3/12 60/659 |
| 2011/0100010 A1* | 5/2011 | Freund | F02C 1/005 60/659 |
| 2012/0167618 A1* | 7/2012 | Huang | F01D 15/005 62/613 |

FOREIGN PATENT DOCUMENTS

| | | |
|---|---|---|
| FR | 2916101 A1 | 11/2008 |
| WO | 2007096656 A1 | 8/2007 |
| WO | 2012095636 A2 | 7/2012 |

OTHER PUBLICATIONS

International Search Report in corresponding PCT Application No. PCT/GB2012/052189, completed Jul. 26, 2013 4 pages.
Written Opinion of the International Searching Authority in corresponding PCT Application No. PCT/GB2012/052189, completed Jul. 26, 2013 (5 pages).
E.M. Smith et al: "Storage of Electrical Energy Using Supercritical Liquid Air" Proc Instn Mech Engrs vol. 191 27/77, p. 289-298, D57-D65; 1977.

* cited by examiner

METHOD AND APPARATUS FOR POWER STORAGE

FIELD OF THE INVENTION

The present invention relates to cryogenic energy storage systems, and particularly to methods for capturing thermal energy, such as cold energy and re-using that captured energy.

BACKGROUND OF THE INVENTION

Electricity transmission and distribution networks (or grids) must balance the generation of electricity with the demand from consumers. This is normally achieved by modulating the generation side (supply side) by turning power stations on and off, and running some at reduced load. As most existing thermal and nuclear power stations are most efficient when run continuously at full load, there is an efficiency penalty in balancing the supply side in this way. The expected introduction of significant intermittent renewable generation capacity, such as wind turbines and solar collectors, to the networks will further complicate the balancing of the grids, by creating uncertainty in the availability of parts of the generation fleet. A means of storing energy during periods of low demand for later use during periods of high demand, or during low output from intermittent generators, would be of major benefit in balancing the grid and providing security of supply.

Power storage devices have three phases of operation: charge, store and discharge. Power storage devices generate power (discharge) on a highly intermittent basis when there is a shortage of generating capacity on the transmission and distribution network. This can be signalled to the storage device operator by a high price for electricity in the local power market or by a request from the organisation responsible for the operating of the network for additional capacity. In some countries, such as the United Kingdom, the network operator enters into contracts for the supply of back-up reserves to the network with operators of power plants with a rapid start capability. Such contracts can cover months or even years but typically the time the power provider will be operating (generating power) is very short. This is illustrated in FIG. 1 which shows a typical operating profile for a storage device. In addition, a storage device can provide an additional service in providing additional load at times of oversupply of power to the grid from intermittent renewable generators. Wind speeds are often high overnight when demand is low. The network operator must either arrange for additional demand on the network to utilise the excess supply, through low energy price signals or specific contracts with consumers or constrain the supply of power from other stations or the wind farms. In some cases, especially in markets where wind generators are subsidised, the network operator will have to pay the wind farm operators to 'turn off' the wind farm. A storage device offers the network operator a useful additional load that can be used to balance the grid in times of excess supply.

A number of storage technologies have been developed, including pumped hydro, compressed air energy storage (CAES) and batteries. Pumped hydro is the most established energy storage technology. It stores hydraulic potential energy by pumping water from a lower reservoir to an elevated reservoir (the charge phase), using low cost electricity during periods of low demand. The water is held in the reservoir until a period of high demand (the store phase). At the time of peak demand, and peak price, the water is released through a turbine which generates electricity (the discharge phase). Pumped hydro provides a high efficiency, relatively low operating cost means of storing electricity. The requirement for two large reservoirs at different elevations, and associated high civil engineering content, can cause installed costs to be very high and limits the number of suitable sites available, many of which have already been exploited.

CAES uses the potential energy of compressed air to store electricity. Low cost electricity is used to compress air which is then stored in a large storage vessel (usually an underground cavern). During the discharge phase, the air is released from the storage vessel, heated and then expanded through a turbine which drives a generator to produce electricity. CAES theoretically provides a relatively high efficiency and low capital cost solution for electrical energy storage. However CAES is constrained by the requirement for a large storage vessel for the stored air.

Batteries store electricity as chemical potential energy, and can respond rapidly to load changes enhancing system stability. They are not geographically constrained in the way that pumped hydro and CAES are, however they are relatively high cost, and their efficiency declines with time, limiting their useful lifetime.

For a storage device to be commercially viable the following factors are important: capital cost per MW (power capacity), MWH (energy capacity), round trip cycle efficiency and lifetime with respect to the number of charge and discharge cycles that can be expected from the initial investment. For widespread utility scale applications it is also important that the storage device is geographically mobile.

Each of the technologies described above has advantages and disadvantages against the above criteria. A further storage technology which offers a number of advantages is the storage of energy using a cryogen such as liquid air, or cryogenic power storage. In the charge phase, low cost electricity at periods of low demand or excess supply from intermittent renewable generators is used to liquefy air, which is then stored as a cryogenic fluid in a storage tank, and subsequently released to drive a turbine and produce electricity during the discharge or power recovery phase. The technology relies on the energy potential of the temperature differential between air in its liquid phase and gas phase at ambient. The advantages of storing energy in liquid air are that liquid air is energy dense compared to compressed air and is stored at low pressure; hence the storage is considerably cheaper; such systems are not geographically constrained as storage tanks are relatively small and readily located and overall capital costs are low.

WO2007-096656A1 and GB1100569.1 disclose Cryogenic Power Storage Devices (CPSD) that utilise a cryogenic fluid, such as liquid air or liquid nitrogen, as the storage medium to store energy as thermal potential energy for providing power storage and network support services to electricity transmission and distribution networks. The Cryogenic Energy System (CES) described in WO2007-096656A1 is a first type of Cryogenic Power Storage Device (CPSD) and is a fully integrated storage device that requires only electricity and, optionally, heat as an input. The cryogenset described in GB1100569.1 is a second type of Cryogenic Power Storage Device (CPSD) and is a simplified storage/power generation device that uses cryogenic fluid manufactured by an industrial gas liquefaction plant remote from the cryogenset, which is delivered to the cryogenset site either by pipeline or tanker.

The key difference between the CES and the cryogenset is that the integrated CES cycle allows the capture of cold energy used to evaporate and heat the cryogen during the power recovery (discharge) phase, which is stored and then used during the charging phase to enhance the production of the liquid air—a concept known as cold recovery. The inventors have found that by capturing and recycling this cold energy, the round trip efficiency of the CES may be double that of the cryogenset.

The present invention addresses the practical implementation of cold recycle within the CES such that the amount of cold recovered and recycled, and hence the round trip efficiency of the overall cycle, is maximised in a practical, low cost manner.

A number of publications describe similar CES devices. These include:
1. U.S. Pat. No. 6,920,759 B2
2. E. M. Smith et al.; "Storage of Electrical Energy Using Supercritical Liquid Air" and Discussion thereof; Proc Instn Mech Engrs Vol 191 27/77, p. 289-298, D57-D65; 1977

These two publications describe similar cycles, shown schematically in FIG. 2. Cryogenic liquid is stored in a storage tank 100. During the power recovery phase of the cycle, the cryogenic liquid is first pumped to high pressure using a pump 105. The cryogenic liquid is then evaporated, and the cold thermal energy is stored in a regenerator, or thermal store 102. Power is then recovered from the resultant gaseous flow through a turbine 106. During the re-liquefaction phase of the cycle the liquid storage tank 100 is replenished; high pressure warm gas is circulated through the cold regenerator and expanded through an expansion valve 101 to manufacture liquid which is stored in the storage tank 100.

The present inventors have noticed that in the CES processes described in the current state of the art, the transfer of thermal energy to the thermal store from a cryogenic liquid during power recovery, or gaseous flow during liquefaction, is done at high pressure. This has the advantage of high potential thermal efficiency, especially if the heat is transferred directly from the working fluid to the thermal store. Two high pressure storage design concepts have been proposed in the past:
1. Direct contact of the working fluid with the storage media (as described by E. M Smith et al (ibid.));
2. Indirect contact of the working fluid with the storage media (as described in U.S. Pat. No. 6,920,759 B2).

The first concept has the advantage of high potential thermal performance in that the heating or cooling fluids are in direct contact with the storage media, typically steel rods as described by Smith et al., or a packed bed of rock particles. The present inventors believe commercial CES systems will need to be at utility scale, of a minimum of 10 MW and preferably 100 MW or higher. The thermal store will therefore be large, having a linear dimension of 10 m or more. The practical difficulties of manufacturing a low cost pressure containment vessel capable of withstanding pressures of at least 100 bar or more typically 150 bar are in the inventors' opinion prohibitive. For this reason, the inventors believe this approach is not viable.

With the second concept, the pressure containment issue is largely resolved in that only the tubes containing the heat transfer fluid are at high pressure. A typical design is shown schematically in FIG. 3. The heat transfer fluid is contained in high pressure tubes 202 and thermal energy is transferred through the tubes by conduction to the storage media 203 which would typically be water, rock chips or concrete. A low cost containment vessel 204 is possible as the vessel only needs to provide mechanical support for the storage media and will operate at low pressure. In the opinion of the present inventors, this design has a number of issues. Firstly, the design will be complex, requiring many high pressure welded joints to be fabricated, yielding an expensive component. Secondly, the thermal resistance between the high pressure tubes and storage media could result in temperature gradients normal to the flow path and poor thermal performance.

Equipment is classified as pressurised equipment by authorised authorities when it functions at a gauge pressure above 4 bar. Equipment functioning at a pressure less than 4 bar is classified as pressurised but can be type approved, and does not require examination by an authorised authority. With a pressure less than 0.5 bar gauge, equipment is not classified as pressure equipment.

The present invention therefore addresses the problem of how to effectively recover the cold thermal energy from the power recovery process, store the recovered cold thermal energy, and effectively utilise the recovered cold thermal energy to reduce the energy cost of manufacturing more cryogen for subsequent storage and re-use in the power recovery process, enhancing the overall (round trip) efficiency of the energy storage system.

The present invention also addresses the problem of how to effectively recover thermal energy from the liquefaction process, store the recovered thermal energy, and effectively utilise the recovered thermal energy to increase output of the power recover process, again enhancing the overall (round trip) efficiency of the energy storage system.

SUMMARY OF THE INVENTION

In order to address these problems, in a first aspect, the present invention provides a cryogenic energy storage system comprising:
  a cryogenic storage tank for storing a cryogen;
  a pump in fluid communication with the cryogenic storage tank, wherein the pump is for compressing the cryogen from the storage tank;
  a first thermal store having a first pathway therethrough for conveying a first heat transfer fluid at a gauge pressure of less than 4 bar;
  a first heat exchanger having:
    a second pathway therethrough for conveying the first heat transfer fluid to the first pathway at a gauge pressure of less than 4 bar, and
    a third pathway therethrough for conveying the compressed cryogen,
  wherein the first heat transfer fluid is for capturing cold thermal energy from the cryogen to heat the cryogen, and for conveying said captured cold thermal energy to the first thermal store at a gauge pressure of less than 4 bar;
  a power recovery system including one or more expansion turbines for expanding the heated cryogen to generate power; and
  a co-located liquefier including:
    a second heat exchanger having:
      a fourth pathway therethrough for conveying the first heat transfer fluid from the first pathway at a gauge pressure of less than 4 bar, and
      a fifth pathway therethrough for conveying a first working fluid to capture cold thermal energy from the first heat transfer fluid and convert the first working fluid into new cryogen; and
    a sixth pathway for conveying the new cryogen to the cryogenic storage tank.

The first heat transfer fluid has a gauge pressure of less than 4 bar. Preferably, the first heat transfer fluid has a gauge pressure of less than 1 bar. More preferably, the first heat transfer fluid has a gauge pressure of less than 0.5 bar.

The first heat transfer fluid may include the exhaust gas from the final turbine stage of the one or more expansion turbines in the power recovery system. In this case, the cryogen becomes the first working fluid when it is exhausted from the power recovery system.

In a second aspect, the present invention provides a cryogenic energy storage system comprising:
  a cryogenic storage tank for storing a cryogen;
  a pump in fluid communication with the cryogenic storage tank, wherein the pump is for compressing the cryogen from the storage tank;
  a first thermal store having a first pathway therethrough for conveying a first heat transfer fluid;
  a first heat exchanger having:
    a second pathway therethrough for conveying the first heat transfer fluid to the first pathway, and
    a third pathway therethrough for conveying the compressed cryogen,
    wherein the first heat transfer fluid is for capturing cold thermal energy from the cryogen to heat the cryogen, and for conveying the captured cold thermal energy to the first thermal store;
  a power recovery system including one or more expansion turbines for expanding the heated cryogen to generate power; and
  a co-located liquefier including:
    a second heat exchanger having:
      a fourth pathway therethrough for conveying the first heat transfer fluid from the first pathway, and
      a fifth pathway therethrough for conveying a first working fluid to capture cold thermal energy from the first heat transfer fluid and convert the first working fluid into new cryogen; and
    a sixth pathway for conveying the new cryogen to the cryogenic storage tank,
    wherein the first heat transfer fluid includes the exhaust gas from the final turbine stage of the one or more expansion turbines in the power recovery system.

The cryogenic energy storage system of the first or second aspect of the present invention may further comprise:
  a second thermal store having a seventh pathway therethrough for conveying a second heat transfer fluid;
  a third heat exchanger having:
    an eighth pathway therethrough for conveying the second heat transfer fluid to the seventh pathway, and
    a ninth pathway therethrough for conveying the heated cryogen,
    wherein the second heat transfer fluid is for capturing further cold thermal energy from the heated cryogen to heat the cryogen further, and for conveying the captured further cold thermal energy to the second thermal store; and
  a fourth heat exchanger having:
    a tenth pathway therethrough for conveying the second heat transfer fluid from the seventh pathway, and
    an eleventh pathway therethrough for conveying a second working fluid to capture cold thermal energy from the second heat transfer fluid.

In a third aspect, the present invention provides a cryogenic energy storage system comprising:
  a cryogenic storage tank for storing a cryogen;
  a pump in fluid communication with the cryogenic storage tank, wherein the pump is for compressing the cryogen from the storage tank;
  a first thermal store having a first pathway therethrough for conveying a first heat transfer fluid;
  a first heat exchanger having:
    a second pathway therethrough for conveying the first heat transfer fluid to the first pathway, and
    a third pathway therethrough for conveying the compressed cryogen,
    wherein the first heat transfer fluid is for capturing cold thermal energy from the cryogen to heat the cryogen, and for conveying the captured cold thermal energy to the first thermal store;
  a power recovery system including one or more expansion turbines for expanding the heated cryogen to generate power;
  a co-located liquefier including:
    a second heat exchanger having:
      a fourth pathway therethrough for conveying the first heat transfer fluid from the first pathway, and
      a fifth pathway therethrough for conveying a first working fluid to capture cold thermal energy from the first heat transfer fluid and convert the first working fluid into new cryogen; and a sixth pathway for conveying the new cryogen to the cryogenic storage tank;

a second thermal store having a seventh pathway therethrough for conveying a second heat transfer fluid;

a third heat exchanger having:

an eighth pathway therethrough for conveying the second heat transfer fluid to the seventh pathway, and a ninth pathway therethrough for conveying the heated cryogen to capture thermal energy from the second heat transfer fluid; and a fourth heat exchanger having:

a tenth pathway therethrough for conveying the second heat transfer fluid from the seventh pathway, and an eleventh pathway therethrough for conveying a second working fluid, wherein the second heat transfer fluid is for capturing thermal energy from the second working fluid, and for conveying the captured thermal energy to the second thermal store.

The following statements of invention are applicable to all aspects of the invention.

The cryogenic energy storage system may further comprise a thermal store exhaust pathway for conveying at least a portion of an exhaust stream from the first thermal store to the second pathway.

The cryogen may be heated by the first heat transfer fluid from the liquid phase to the gaseous phase. Alternatively, if the cryogen is a supercritical fluid, the cryogen may be heated without a change in phase.

The liquefier is a refrigeration device for the cooling of a gaseous working fluid to its liquid state. The working fluid preferably comprises air, and the cryogen preferably comprises liquid air.

The second heat transfer fluid may have a gauge pressure of less than 4 bar, preferably less than 1 bar, and more preferably less than 0.5 bar.

The pump may be used to compress the cryogen to a gauge pressure of greater than 30 bar.

The second heat transfer fluid may be either gaseous or a liquid. The second heat transfer fluid may comprise methanol, ethanol or propanol.

The second heat exchanger and the fourth heat exchanger may be the same heat exchanger. The second working fluid may be the same as the first working fluid. The eleventh pathway may be for converting the second working fluid into new cryogen, and for conveying the new cryogen to the cryogenic storage tank.

The liquefier comprises a cryogenic liquefaction plant which may include an expansion turbine, and the system may further include a twelfth pathway for conveying exhaust gas at a gauge pressure of less than 4 bar from the expansion turbine within the liquefaction plant to the first pathway through the first thermal store.

The liquefaction plant may further include one or more gas compressors, and the system may further include a thirteenth pathway for conveying compressed gas from the one or more gas compressors within the liquefaction plant to the expansion turbine within the liquefaction plant. The one or more gas compressors comprises a main gas compressor adapted to compress ambient gas to a pressure of at least 5 bar, and a recycle gas compressor adapted to further compress the gas to a pressure of at least 25 bar.

The fourth heat exchanger may comprise a pre-cooler for the expansion turbine within the liquefaction plant. Alternatively, the fourth heat exchanger may comprise a pre-cooler for the one or more gas compressors within the liquefaction plant.

Alternatively, the fourth heat exchanger may comprise one or more compressor intercoolers for capturing thermal energy from an outlet stream of a respective one or more gas compressors within the liquefaction plant.

The third heat exchanger may comprise one or more heat exchangers for capturing cold thermal energy from an outlet stream of a respective one or more expansion turbines within the power recovery system.

Alternatively, the third heat exchanger may comprise one or more superheaters for superheating an inlet stream of a respective one or more expansion turbines within the power recovery system.

The second heat exchanger may comprise one element of a cold box within the liquefaction plant. The twelfth pathway may pass through the cold box within the liquefaction plant. A cold box is generally an assembly of heat exchangers, pipes and pressure vessels contained inside a metal structure filled with high quality insulation material, such as perlite.

The first heat transfer fluid may be a gaseous fluid. The first heat transfer fluid may be dry air, dry nitrogen or a suitable other gas or refrigerant fluid such as methane, methanol, propanol or propane.

The expansion turbine within the liquefaction plant may comprise a first warm expansion turbine, or a second cold expansion turbine. The first warm expansion turbine operates typically at an inlet temperature of between ambient and $-100°$ C., expanding to an outlet temperature of between $-100°$ C. and $-200°$ C. The second cold expansion turbine operates typically at an inlet temperature which is similar to, or the same as, the warm turbine outlet temperature, expanding to a temperature close to the condensation temperature of the working fluid. The warm and cold expansion turbines may be compressor loaded turbines, often referred to as companders, that provides efficient cooling of the process fluid through quasi adiabatic expansion of the fluid and recovery of the expansion work through a coaxial compressor stage.

The cryogen may comprise liquid air.

The first, second and fourth pathways may be formed as a closed-loop system.

The seventh, eighth and tenth pathways may be formed as a closed-loop system.

The system may further comprise an air compressor for circulating the first heat transfer fluid.

The system may further comprise an air compressor or gas compressor or fluid pump for circulating the second heat transfer fluid.

The fourth heat exchanger may comprise a refrigeration module and the second working fluid may comprise a refrigerant within the refrigeration module, wherein the refrigerant is for cooling the working fluid in the second heat exchanger.

The first and/or the second thermal store may have a variable geometry design.

The first thermal store may comprise a containment vessel containing a storage media, and the first pathway may be such that the first heat transfer fluid is in direct contact with the storage media.

The second thermal store may comprise a containment vessel containing a storage media, and the seventh pathway may be such that the second heat transfer fluid is in direct contact with the storage media.

The systems of the present invention are such that cold thermal energy can be effectively recovered from the power recovery process of a cryogenic energy storage system, stored in direct contact with a very low pressure thermal store, and effectively utilised. The recovered cold thermal energy can be used in the liquefaction process to reduce the energy consumption of the liquefier and hence deliver a low cost, and efficient energy storage device.

In addition, the inventors have identified the following factors that should be considered in developing a system according to the present invention:

operating the thermal store at very low pressures to minimise the cost of the store;
  using heat transfer fluids, or a combination of heat transfer fluids, that can operate between cryogenic temperatures (typically −180° C.), and ambient temperatures (typically 10° C.) without a change of phase from liquid to solid or gas to liquid. A change of phase in the heat transfer media could significantly complicate the heat transfer loops and thermal store design;
  minimising additional components, such as pumps, compressors and heat exchangers to minimise plant capital costs; and
  not using gaseous heat transfer fluids, as these have a detrimental impact on the parasitic power consumption of the plant and therefore efficiency.

Throughout the present specification, the following terms are defined as follows:

| | |
|---|---|
| Very Low Pressure | 0 to 4 bar gauge, preferably less than 1 bar gauge, more preferably less than 0.5 bar gauge |
| Low pressure | 4 to 10 bar gauge |
| Medium Pressure | 10 to 30 bar gauge |
| High Pressure | 30 to 100 bar gauge |
| Very High Pressure | >100 bar gauge |

In practice, "Very low pressure" is between ambient and slightly higher than ambient so that the containment vessel of the thermal store is not classed as pressurised equipment. With a pressure less than 4 bar, the respective thermal store would be classified as a pressure vessel but can be type approved. Therefore each individual thermal store manufactured would not require examination by an authorised authority such as a notified body. In the European Union, such a thermal store would be classified as a Category III pressure vessel which can be approved through design examination and the application of approved quality standards during the manufacturing process. With a pressure less than 0.5 bar gauge, the first thermal store would not be classified as pressure equipment, and sound engineering practice would need to be applied to the design and manufacturing process.

The present invention also provides corresponding methods of storing energy as recited in the claims, to which the above statements are also applicable.

BRIEF DESCRIPTION OF THE DRAWINGS

Embodiments of the present invention will now be described with reference to the figures in which.

DETAILED DESCRIPTION OF THE INVENTION

Figure 1:
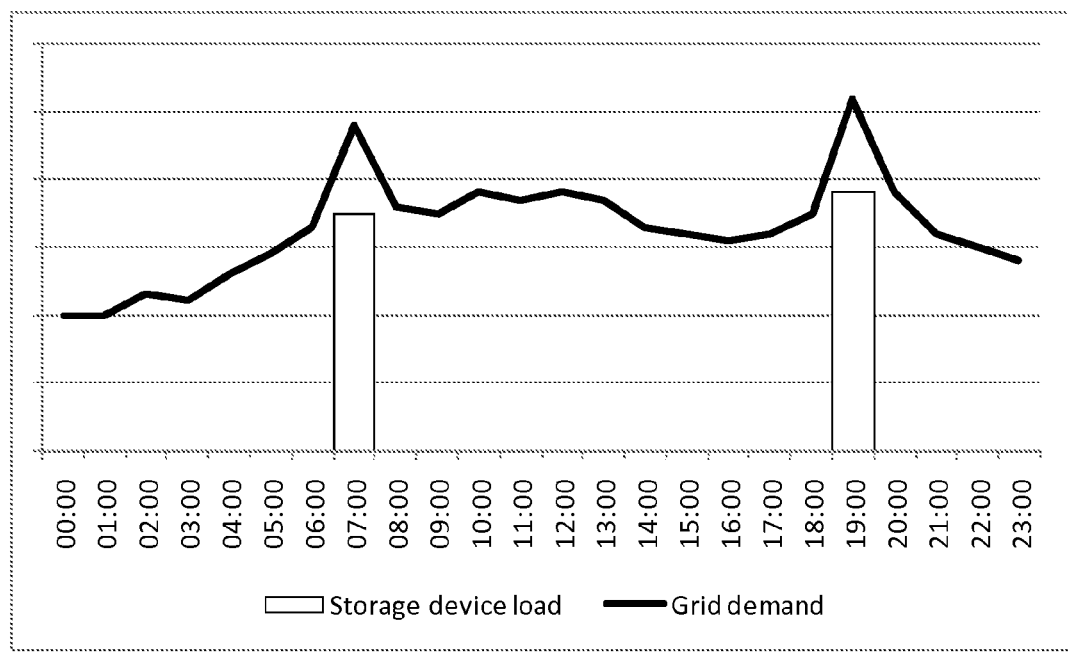
FIG. 1 shows the typical generating regime of an energy storage device.
Figure 2:
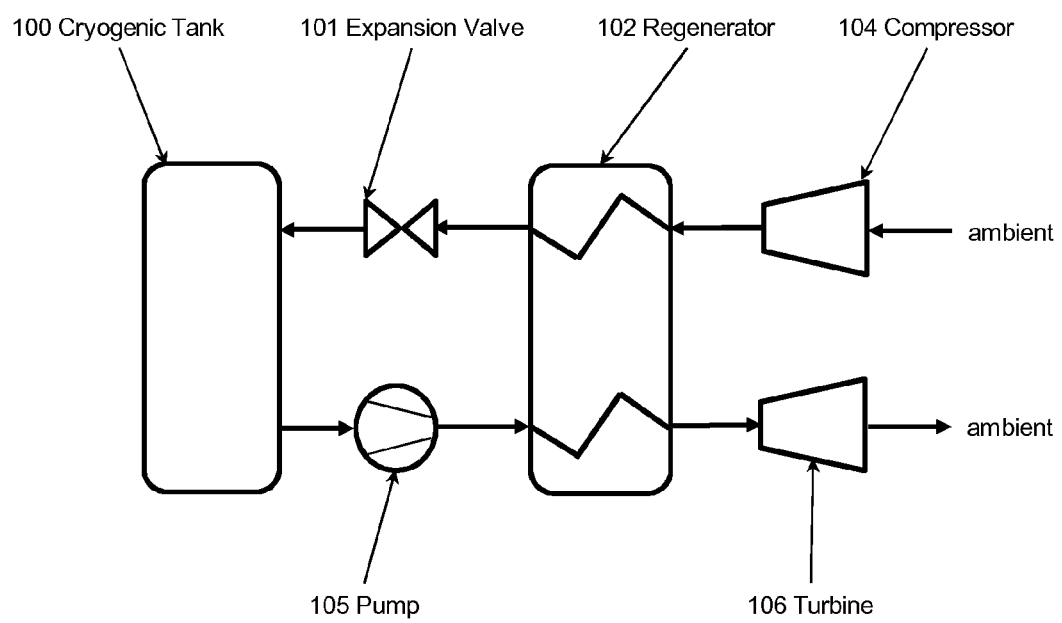
FIG. 2 shows a typical state of the art cryogenic energy storage system (CES) as disclosed in U.S. Pat. No. 6,920,759 B2 and E. M. Smith 1977 (ibid)
Figure 3:
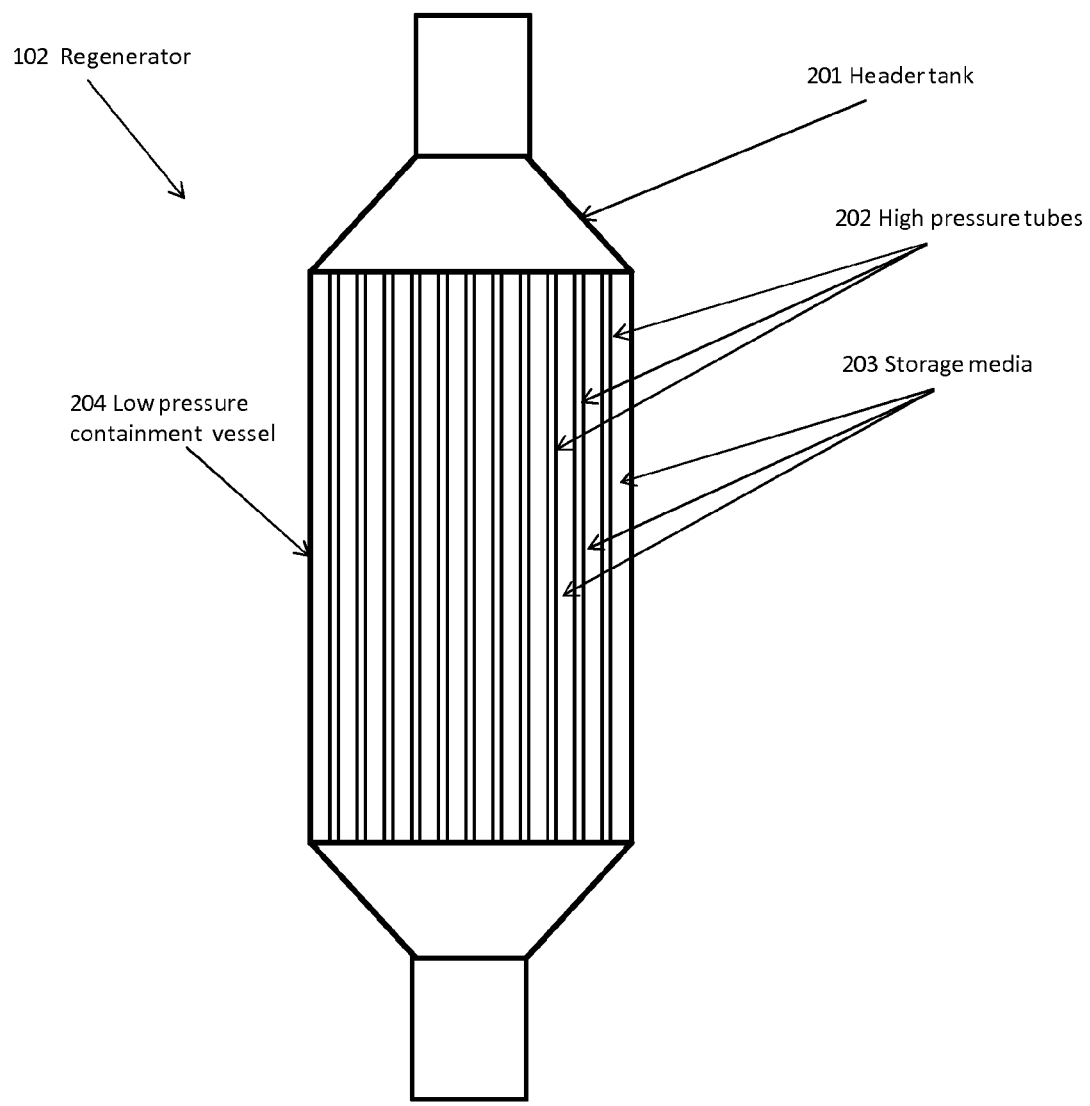
FIG. 3 shows a typical state of the art high pressure regenerator as disclosed in U.S. Pat. No. 6,920,759 B2.
Figure 4:
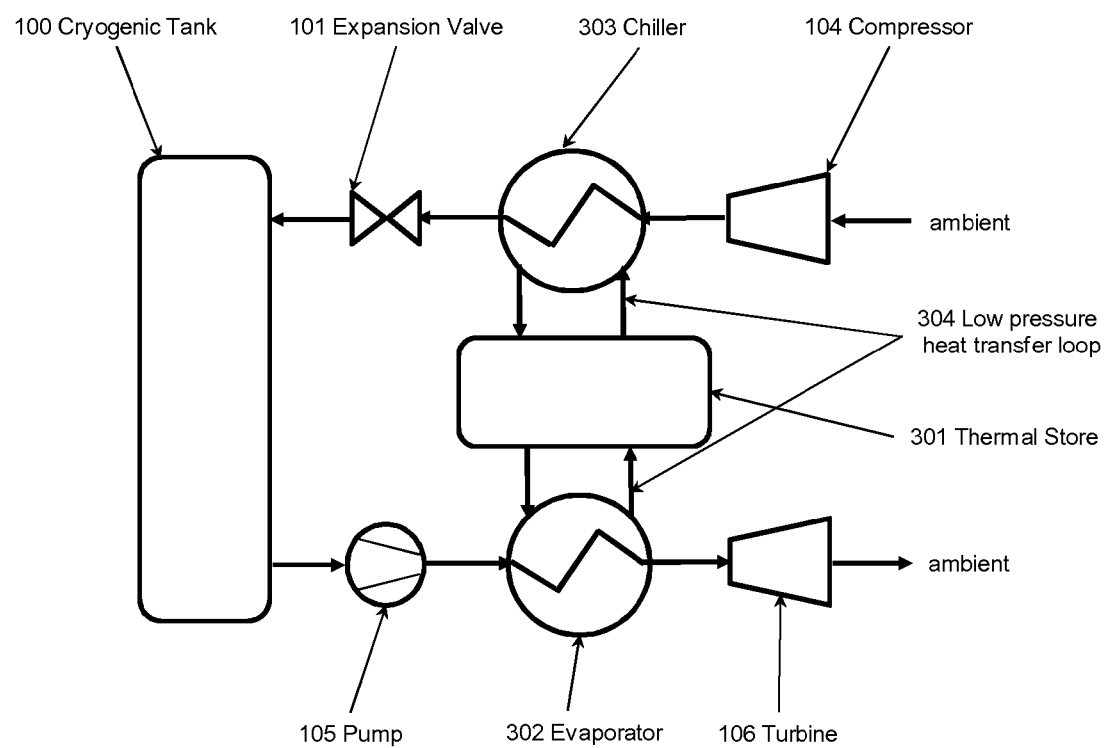
FIG. 4 shows a schematic of a cryogenic energy storage system according to a first embodiment of the present invention.

FIG. 4 shows a schematic of a first simplified embodiment of the present invention. The system of FIG. 4 is similar to that shown in FIG. 2 except that the regenerator shown in FIG. 2, in which the process gasses flow directly through the regenerator, is replaced in FIG. 4 by a thermal store with an intermediate very low pressure heat transfer loop.

During the power recovery (discharge) phase of the cycle, the cryogenic fluid is first transferred from the storage tank 100 to the pump 105 where the fluid is compressed to high pressure, of at least 30 bar, more preferably at least 50 bar, and more typically 100 to 200 bar. Cold thermal energy is transferred via a heat exchanger, referred to as the evaporator 302, to a heat transfer fluid that circulates between the evaporator and thermal store 301 via a very low pressure heat transfer loop 104. The heat transfer loop typically consists of connecting pipework, a circulation pump and associated instruments and control valves. The heat transfer fluid may be dry air, dry nitrogen or a suitable other gas or refrigerant fluid such as methane, methanol, propanol or propane.

During the storage phase of the cycle, both heat transfer loops can be shut down to isolate the thermal store from the environment and minimise heat losses. Similarly, the cryogenic storage tank can be isolated from the environment to the extent that any boil-off gas can be vented from the cryogenic fluid safely but heat leak into the tank can be minimised.

During the liquefaction (charging phase) of the cycle, ambient air is first compressed in a compressor 104 to at least 10 bar and more typically 40 to 60 bar. Typically, impurities such as $CO_2$, water and hydrocarbon contaminants are removed from the high pressure gas. Cold thermal energy is then transferred from the thermal store to the high pressure gas via a very low pressure heat transfer loop 104 to a heat exchanger, referred to as the chiller 303. The now cold gas is then expanded through a valve 101 to produce liquid air that is stored in the cryogenic storage tank 100. Typically the composition of the cold air after the expansion valve is a mixture of liquid and gaseous air. The gaseous air is often returned to the chiller to provide additional cooling of the high pressure air before expansion.

Further embodiments are described in more detail as follows.

Figure 5:
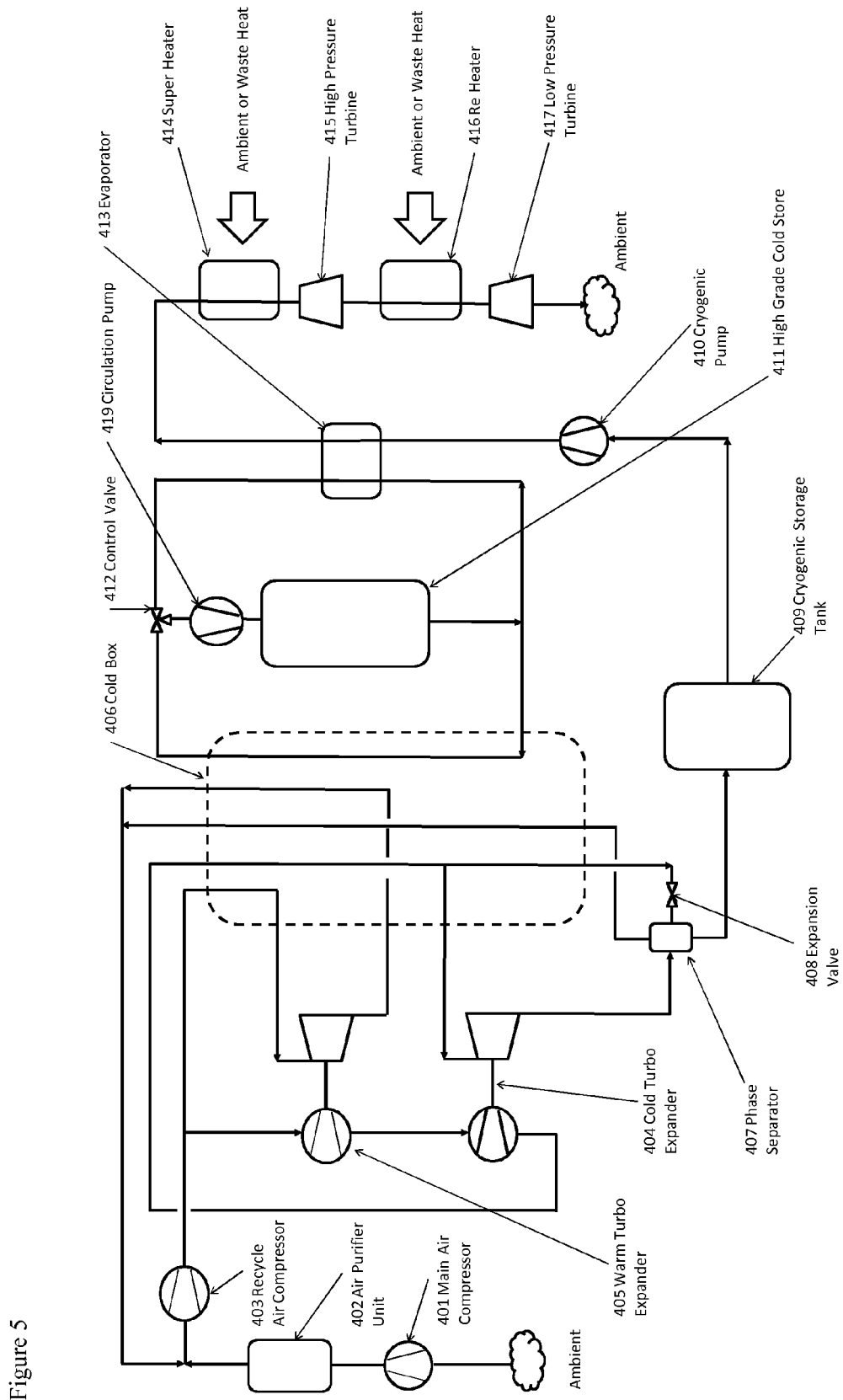
FIG. 5 shows a second embodiment of the current invention.

The second embodiment of the current invention is shown in FIG. 5. Considering the discharge (power recovery) part of the cycle first, cryogenic fluid, which could be liquid air, liquid nitrogen or a similar low temperature fluid is transferred first from the cryogenic storage tank 409 to the cryogenic pump 410. This is commonly achieved by a gravity feed from the storage tank but may be assisted by an intermediate low pressure boost pump. The cryogenic fluid is compressed by the cryogenic pump 410 to high pressure of at least 50 bar and more commonly 100 to 200 bar. Thermal energy is added to the cryogenic fluid from a heat transfer fluid in the evaporator 413 to raise the temperature of the cryogenic fluid to typically 0 to 20° C. During the heating process, the cryogenic fluid will undergo a change of phase from liquid to gas if the process is operated below the critical pressure, or more typically will expand remaining in the supercritical state if the process is operated above the critical pressure for the cryogenic working fluid. Thermal energy is transferred to the evaporator 413 to provide heating of the cryogenic fluid via a very low pressure circulation loop connecting the evaporator 413 to the thermal store 411 known as the high grade cold store. A heat transfer fluid is circulated through the high grade cold store 411 and evaporator 413, via the circulation pump 419 and control valve 412. The heat transfer fluid in this embodiment will typically be a gas such as dry air or dry nitrogen as few liquids are available that will remain in the liquid state over the temperature range of −180° C. to 10° C. which the process will typically operate. The now heated cryogenic fluid will then be further heated in a super heater 414, using thermal energy from the ambient environment or more typically low grade waste heat from a co-located process, such as condensate water from a thermal power station. The heated cryogenic fluid is then expanded first through a high pressure turbine 415 and then through a low pressure turbine 417. The gas is usually re-heated between the turbine stages using a heat exchanger referred to as the re heater 416 using ambient or low grade waste heat. Additional turbine stages with inter-stage reheaters may be added to improve the efficiency of the process, three or four being the preferred number of stages.

On completion of the power recovery process, the cold high grade cold store 411 and cryogenic storage tank are isolated to minimise thermal losses during the storage phase of the cycle. A relief valve is commonly included on the storage tank to allow safe venting of boil off gas from the stored cryogenic liquid.

During the liquefaction (charging) phase of the cycle, the following process is used, which is a two expander variant of the Claude cycle and is commonly used on modern air liquefaction plants. The Claude cycle is a refrigeration cycle where part of the refrigeration cooling is provided through the expansion of a gas through an adiabatic expansion engine, such as a turbine. In the two expander variant used here, the process gas, which could be ambient air, nitrogen or a similar gas, is first compressed to typically 5 to 10 bar in the main air compressor 401. Impurities, such as $CO_2$, water and hydrocarbons that may freeze in the cold parts of the plant are removed in the air purifier 402, typically a regenerative adsorber. The high pressure air is then further compressed in a recycle air compressor 403 to typically 25 to 70 bar. After the recycle air compressor 403, the flow is divided into two streams. The first stream is further compressed by the compressor stages of first a warm turbo expander 405 and then a cold turbo expander 404 to typically 40 to 60 bar. Preferably, the gas is compressed to above the critical point of the gas, or 39.2 bar for air. This stream then enters a multi pass heat exchanger, or more commonly a series of multi pass heat exchangers commonly referred to as a cold box 406. A cold box is generally embodied as an insulated (typically metal) box, filled with high performance insulation materials such as perlite. The low temperature heat exchange processes occur within the cold box via components such as the multi pass heat exchangers, phase separator, and turbine stages of the warm and cold turbines. The gas is cooled in the cold box 406 and further divided. One stream is expanded in the expander stage of the cold turbo expander 404 to the product delivery pressure, typically 1 to 6 bar. In expanding the gas, the gas is substantially cooled preferably to the point where liquid droplets are just starting to form. The partially wet vapours from the cold turbo expander 404 are then introduced to a phase separator 407. The second cold box stream is further cooled in the cold box 406 and then expanded in an expansion valve 408, often referred to as a Joules Thompson (JT) valve. The cold gas substantially condenses to liquid during the expansion process and enters the phase separator 407. The liquid product is separated from the vapour phase in the phase separator 407 and stored in the cryogenic storage tank 409 for later use. The vapour phase is returned to the cold box 406 which provides cooling for the high pressure gas stream.

The second stream separated after the recycle air compressor 403 is first cooled in the cold box 406 and then expanded in the warm turbo expander 405 to reduce the pressure and temperature of the gas. This now cool gas stream is then introduced to the cold box 406 to provide cooling.

In this embodiment of the present invention, additional cooling of the process gas is provided by recycling the cold energy recovered during the power recovery phase of the cycle and stored in the high grade cold store 411. This is achieved by circulating the heat transfer fluid through the high grade cold store 411 using the circulation pump 419 such that the heat transfer fluid is cooled to close to the condensation temperature of the process gas. The heat transfer fluid is introduced close to the bottom of the cold box 406 heat exchanger where it is warmed by the process gas and provides cooling of the process gas.

Figure 6:
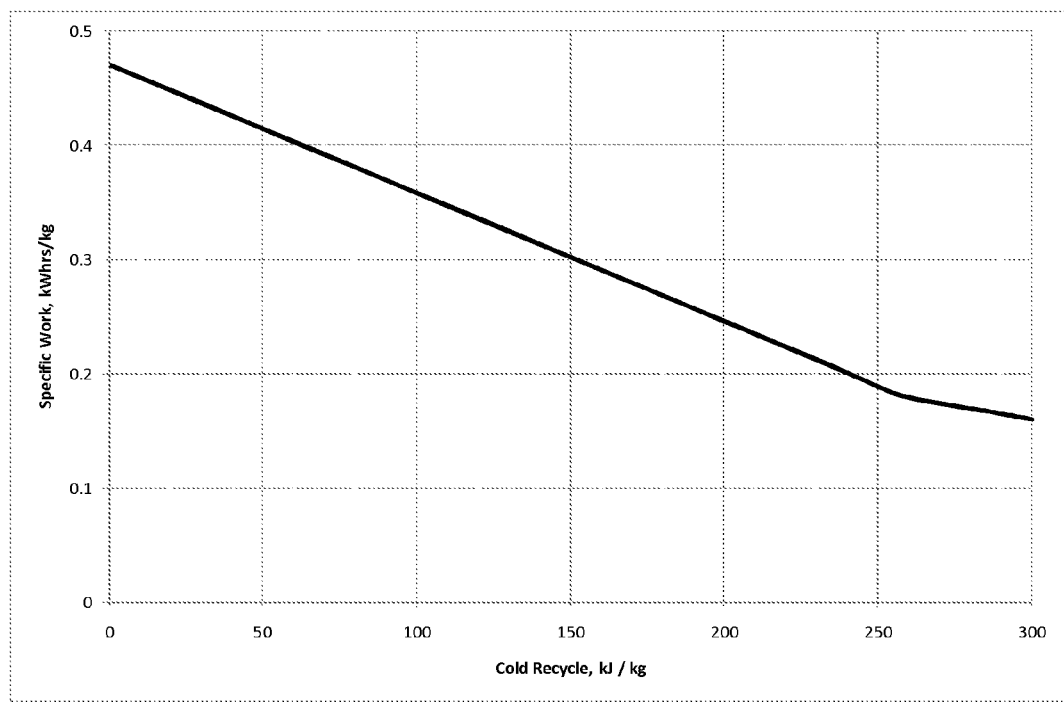
FIG. 6 shows the reduction in the energy required to liquefy a kg of air for different quantities of cold recycle.

The present inventors have found that effective recovery, storage and recycle of the cold energy released during the power recovery process can more than halve the energy required to re-liquefy the process gas. This is illustrated in FIG. 6 which shows the reduction in the energy (in kWhrs) required to liquefy a kg of air (the preferred process fluid) for different quantities of cold recycle, expressed in kJ/kg of working fluid. Modern liquefiers typically operate at a specific work requirement of 0.43 kWhrs per kg of liquid air produced. Calculations by the inventors have indicated that the specific work to liquefy the process gas can be reduced to less than 0.2 kWhrs/kg if more than 72% of the cold energy released during the power recovery process can be recovered.

Figure 7:
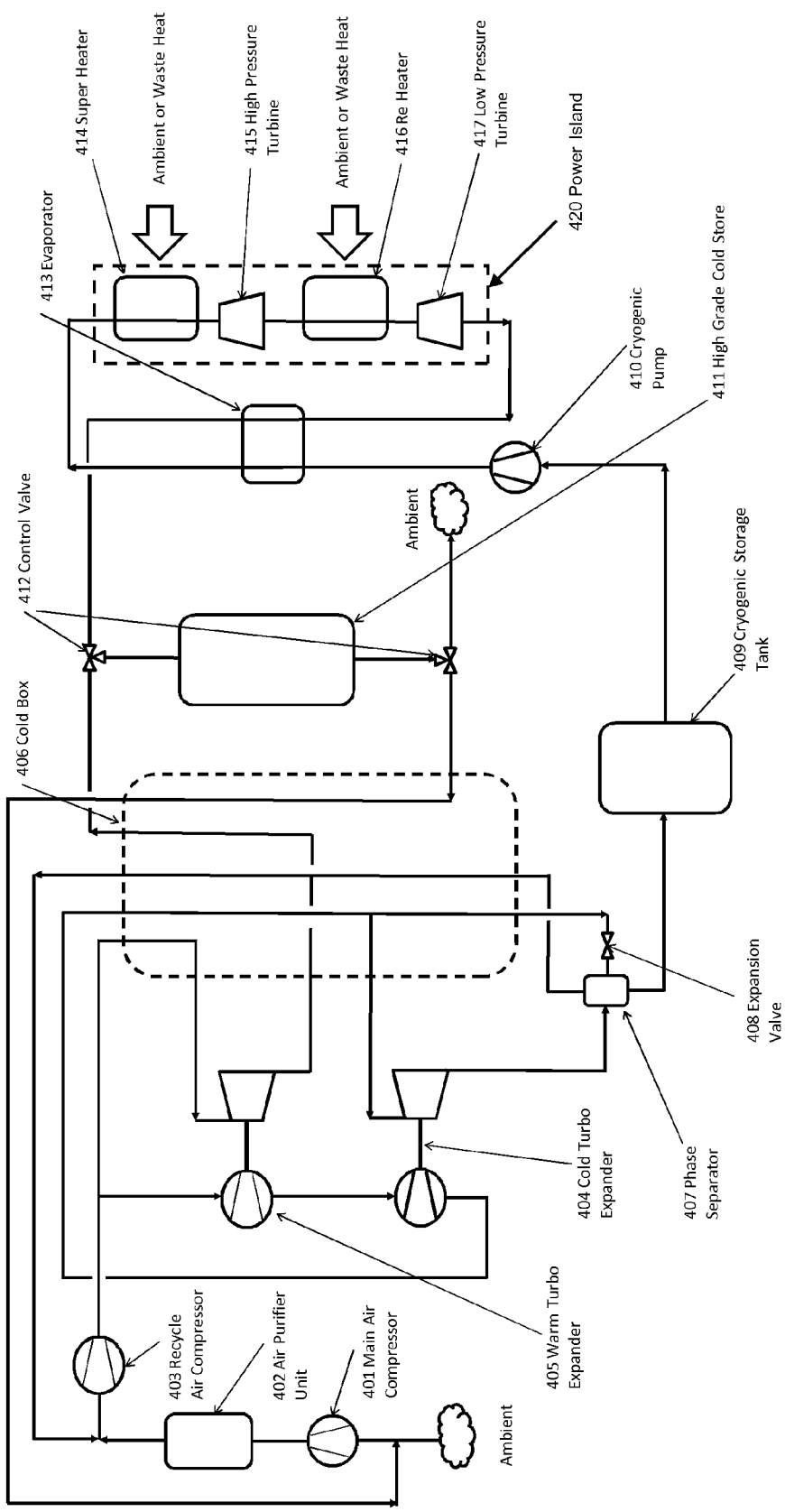
FIG. 7 shows a third embodiment of the current invention.

In a further embodiment of the present invention shown in FIG. 7, the cycle is modified to operate without the circulation pump 419. During power recovery, the very low pressure gaseous exhaust of the low pressure turbine 417 is used to evaporate and heat the working fluid in the evaporator heat exchanger 413. The resultant cold very low pressure stream can then be directly introduced to the high grade cold store 411 to recover and store the cold thermal energy. During liquefaction, the process is modified such that the very low pressure outlet of the warm turbine 405 is ducted after warming in the cold box 406 to the high grade cold store. The warm very low pressure gas stream is cooled in the high grade cold store 411 and the resultant very low pressure cold gas stream is introduced to the bottom of the cold box 406 to enable the cold energy to be recycled and used to reduce the energy cost of liquefaction. The flow of the cold store 411 is controlled by two control valves 412 that control the connection to the power recovery and liquefier parts of the cycle. These modifications to the design have the advantage of reducing the complexity and therefore cost of the system in that the circulation pump 419 is no longer required. There will be a small penalty in efficiency in that both the warm turbine 405 and low pressure turbine 417 will suffer higher back pressure from the high grade cold store 411. However, if the high grade cold store 411 is optimised to operate at a low pressure loss over the range of exhaust gas flow rates by sizing the flow area of the store such that the velocities and hence pressure losses in the store are low, the back pressure will be small.

Figure 8:
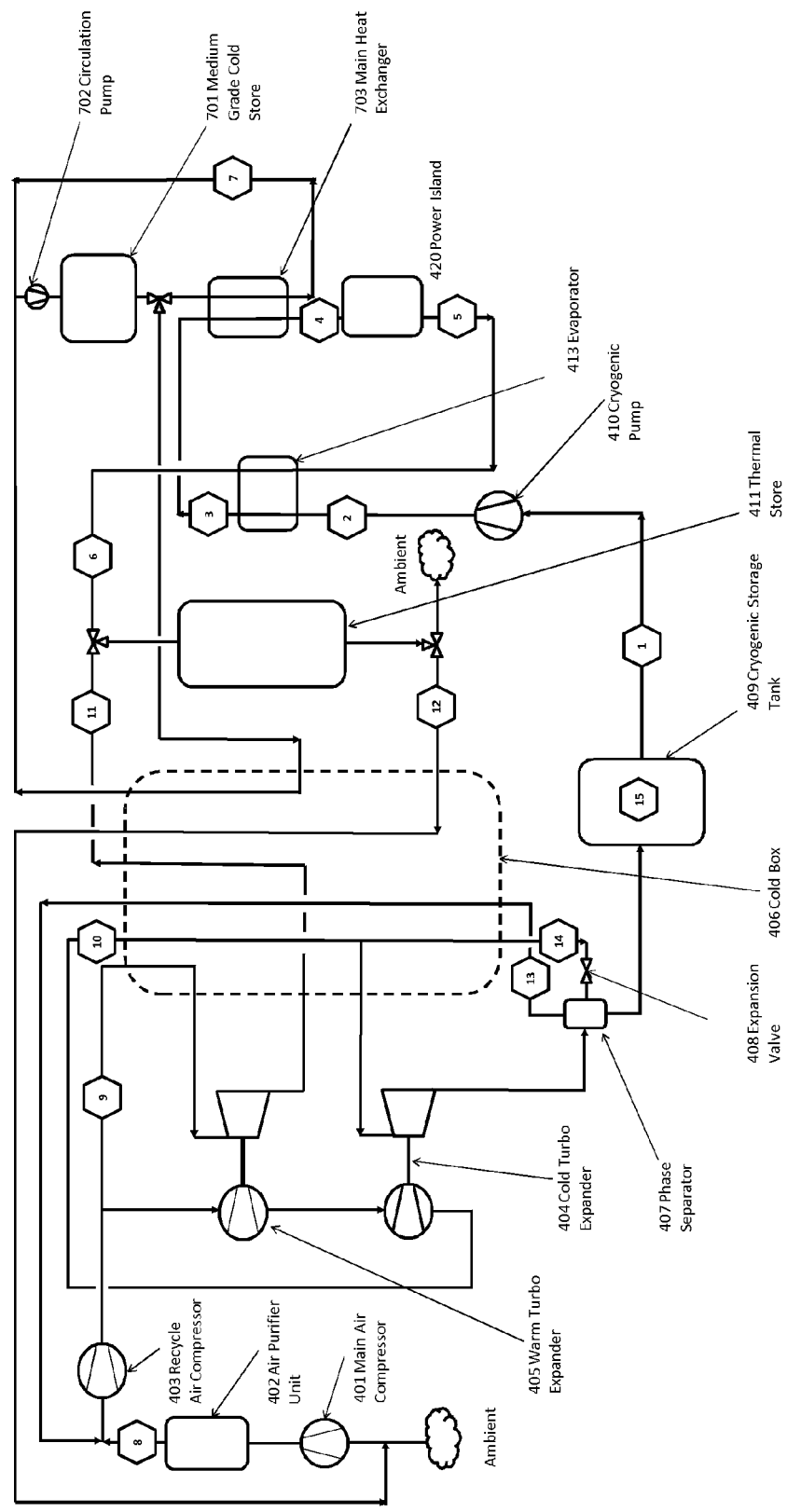
FIG. 8 shows a fourth embodiment of the current invention.

In a further embodiment shown in FIG. 8, an additional cold store 701 is added to the system. The component 420 shown in FIG. 8 is referred to as the Power Island and includes the components shown in the dashed box 420 in FIG. 7. The inventors have noticed that in the embodiment of FIG. 7, where the low pressure turbine 417 exhaust is used to provide the evaporation heating of the working process fluid during power recovery, only around two thirds of the available cold energy can be recovered for cold recycle. This is because the enthalpy released in heating the high pressure cryogen from the liquid state to ambient temperature is higher than the enthalpy required to cool air from ambient temperature to the temperature of the high pressure cryogenic liquid as follows:

| | |
|---|---|
| Enthalpy released in heating air at 100 bar from −170 to 10° C. | 333 kJ/kg |
| Enthalpy required to cool air at 1 bar from 10° C. to −170° C. | 182 kJ/kg |

The inventors have realised that by adding an additional medium grade cold store 701 after the evaporator 413 it is possible to capture the cold energy not captured by the evaporator 413. The energy is captured using a closed loop circuit thermally linked to the power recovery circuit via main heat exchanger 703. The very high pressure working fluid typically leaves the evaporator 413 at −90 to −120° C. As such, gases such as air or nitrogen could be used as the working fluid in the medium grade cold store closed loop circuit, or alternatively liquid refrigerants such as methanol or propanol could be used as the working fluid in the medium grade cold store closed loop circuit. Such liquids are suitable for operating between these temperatures and ambient temperature. The use of liquid refrigerants is preferred as the energy cost in pumping a liquid through the medium grade cold store 701 and around the associated pipework and cold box 406 heat exchangers will be considerably lower than for a gas. In addition, the capital cost of the circulation pump 702, valves and pipework is lower for a liquid heat transfer circuit compared to a gas heat transfer circuit. The working fluid, such as a liquid refrigerant, is circulated using a pump 702. During power recovery, the circulation pump 702 is used to circulate the refrigerant liquid through the main heat exchanger 703, through the medium grade cold store 701 and through the cold box 406 heat exchangers. The refrigerant liquid is introduced at a point in the cold box 406 at equilibrium with the temperature of the medium grade cold store 701 to ensure optimal thermal efficiency.

The hexagonal numbered boxes in FIG. 8 show positions in the system at which the gauge pressures and temperatures are as follows:

| | Gauge Pressure | Temperature |
|---|---|---|
| 1 | Low Pressure | −196° C. to −177° C. |
| 2 | Very High Pressure | −185° C. to −170° C. |
| 3 | Very High Pressure | −120° C. to −90° C. |
| 4 | Very High Pressure | 10 to 20° C. |
| 5 | Very Low Pressure | −40 to 10° C. |
| 6 | Very Low Pressure | −185° C. to −170° C. |
| 7 | Very Low Pressure | −120° C. to −90° C. |
| 8 | Low Pressure | 10 to 40° C. |
| 9 | Medium Pressure | 10 to 40° C. |
| 10 | High Pressure | 10 to 40° C. |
| 11 | Very Low Pressure | 10 to 30° C. |
| 12 | Very Low Pressure | −185° C. to −170° C. |
| 13 | Low Pressure | −190 to −170° C. |
| 14 | High Pressure | −190 to −170° C. |
| 15 | Low Pressure | −194 to −175° C. |

Equivalent positions in FIGS. 5, 7 and 9 to 11 are at equivalent temperatures and pressures.

Figure 9:
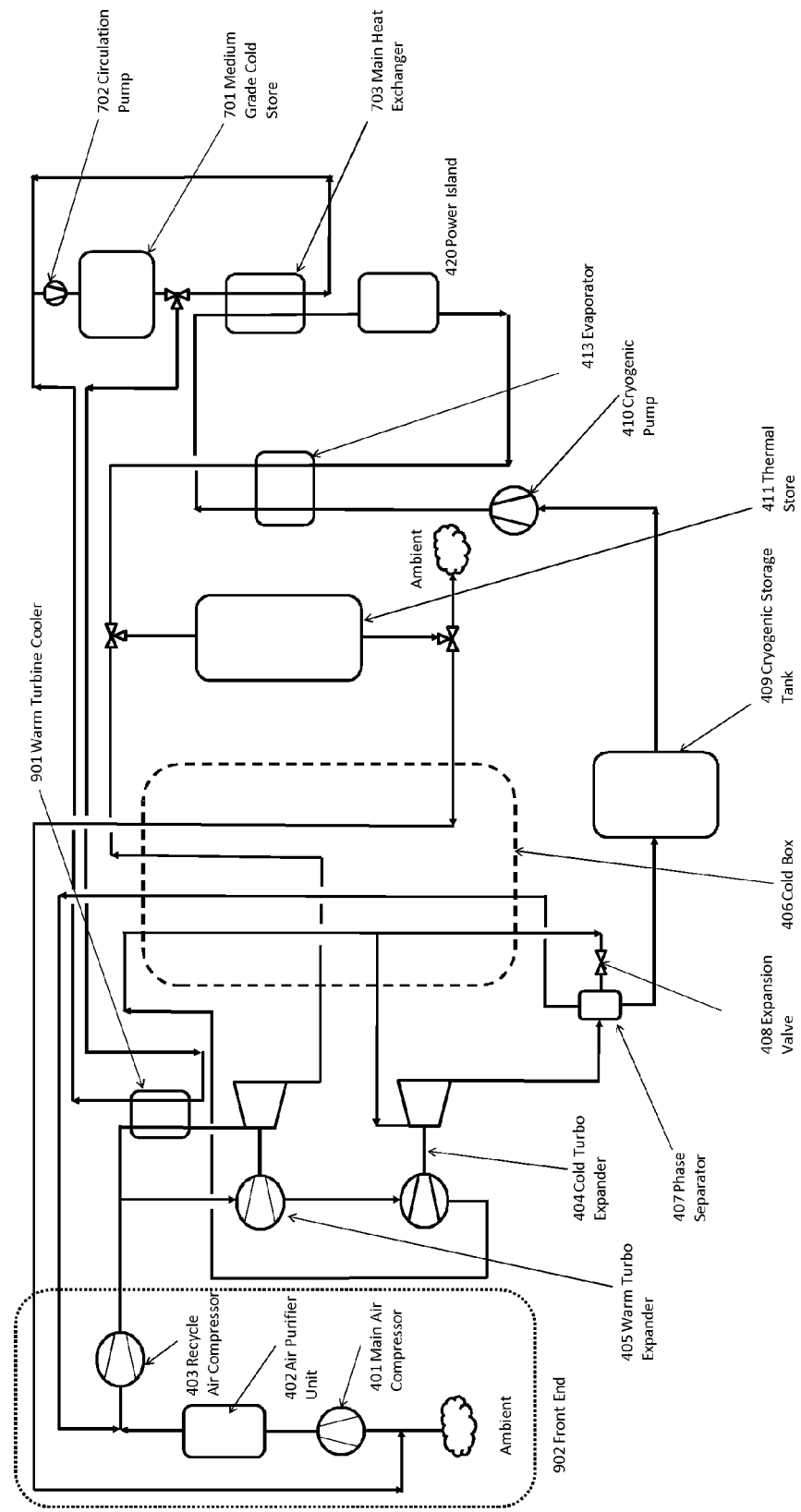
FIGS. 9 to 11 show fifth, sixth and seventh preferred embodiments of the current invention.

A further embodiment is shown in FIG. 9. This embodiment is the same as that of FIG. 8 except that the cold thermal energy stored in the medium grade cold store 701 is used to pre cool the warm turbine using a warm turbine cooler 901, instead of being used to cool the cold box 406. This embodiment has the advantage of removing one flow stream from the cold box 406, thus simplifying the design. The warm turbine cooler 901 can be a simple shell and tube, plate fin or similar heat exchanger.

Figure 10:
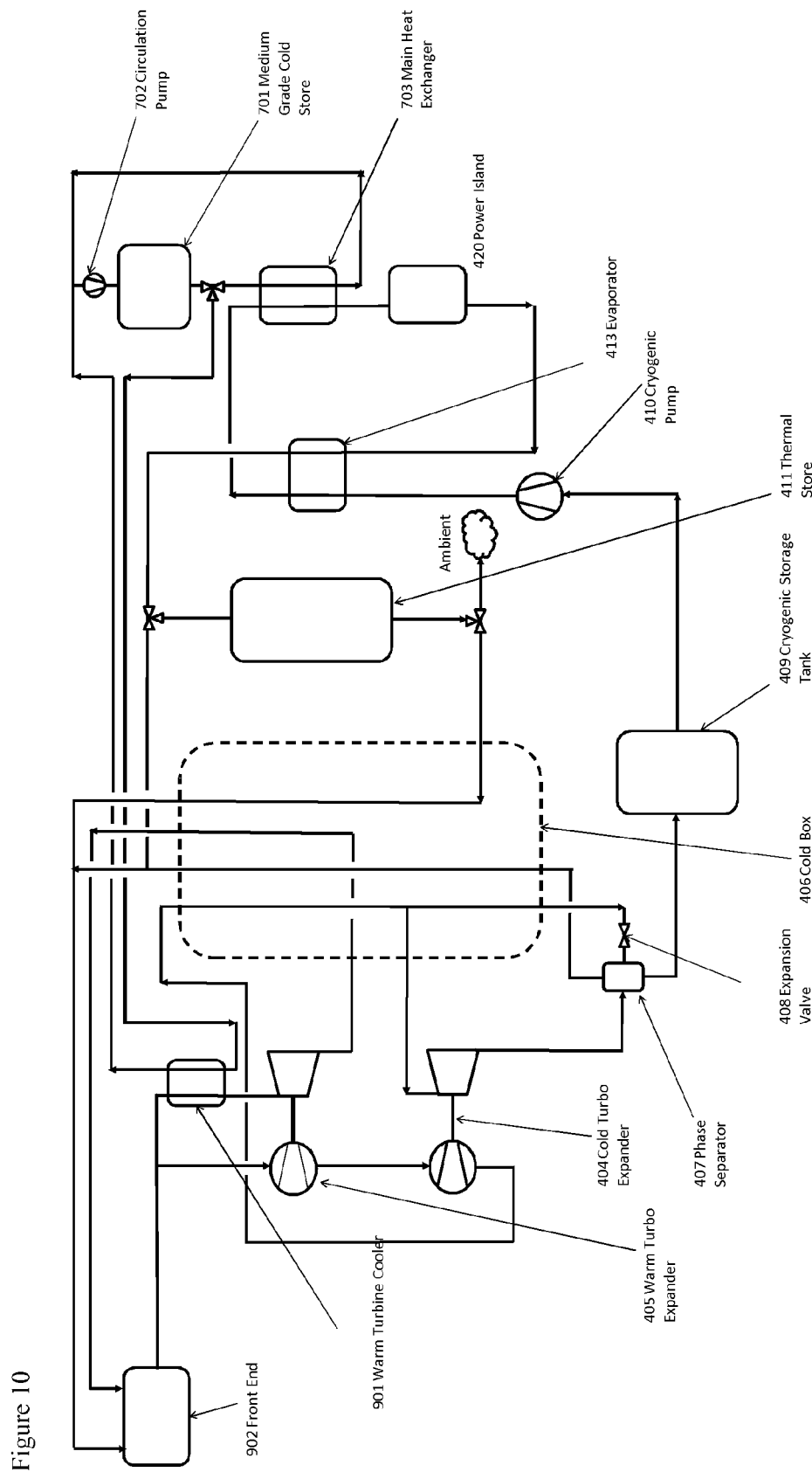
Figure 11:
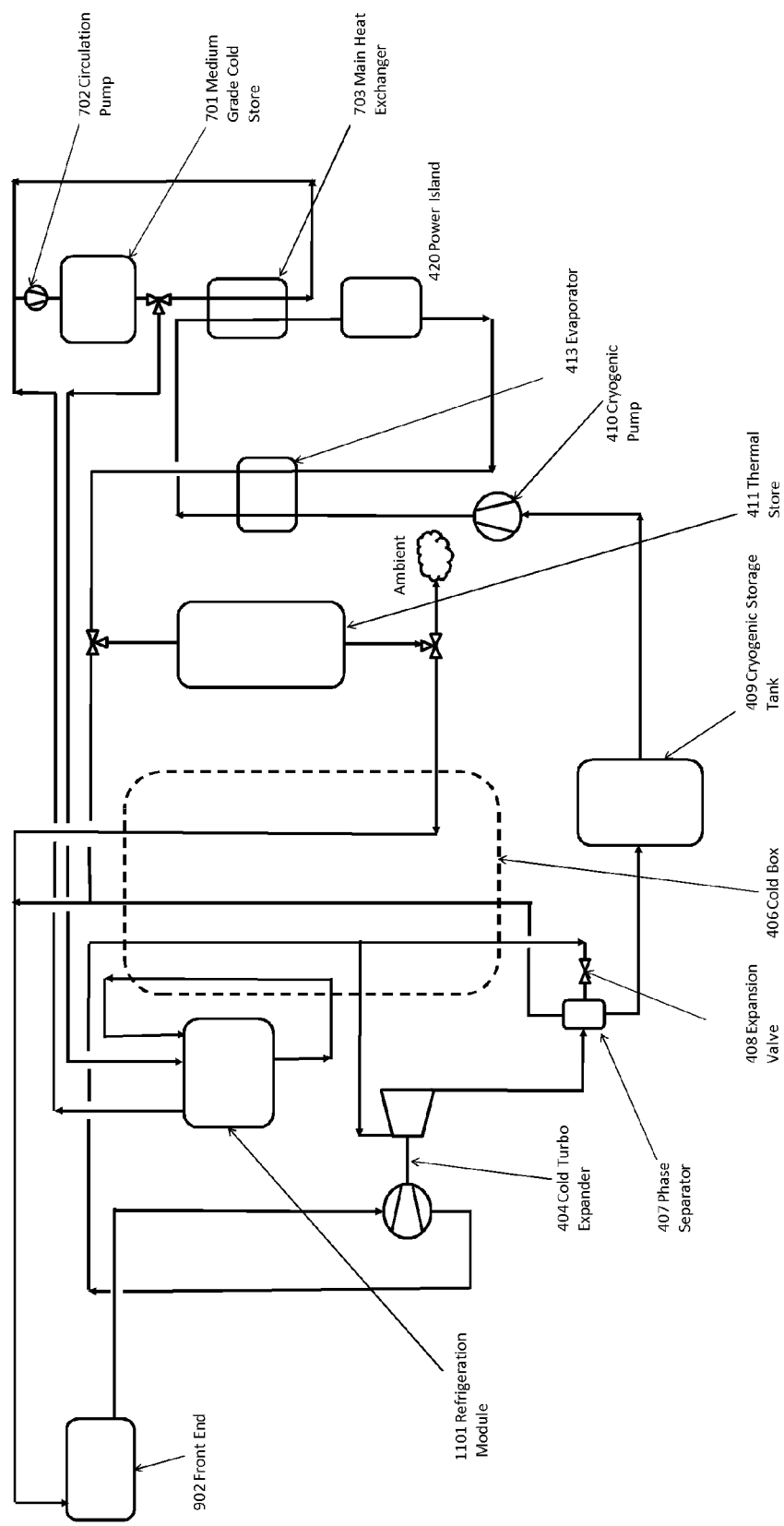

A further embodiment is shown in FIG. 10 in which the preferred embodiment is modified slightly such that the cold turbine exhaust is used to provide the cold recovery flow to the high grade cold store during the charging (liquefaction) phase of the cycle, rather than the warm turbine flow. The flow to the high grade cold store can be taken from the cold turbine exhaust directly, or preferably (as shown in FIG. 10) after the phase separator. This embodiment is preferred where the cryogenic liquid is stored at ambient or near ambient pressure and the phase separator (407) pressure is at or near ambient pressure. A further embodiment is shown in FIG. 11, in which the warm turbine is replaced by a liquid refrigeration module 1101. The medium grade cold from the medium grade cold store 701 is used to cool the high pressure liquid in the refrigeration module 1101 prior to expansion cooling to improve the refrigeration performance of the circuit. This embodiment improves the overall efficiency of the process but has a higher capital cost. As such, this embodiment is preferred in markets and applications where efficiency is very important and a higher capital cost is economically viable.

Figure 12:
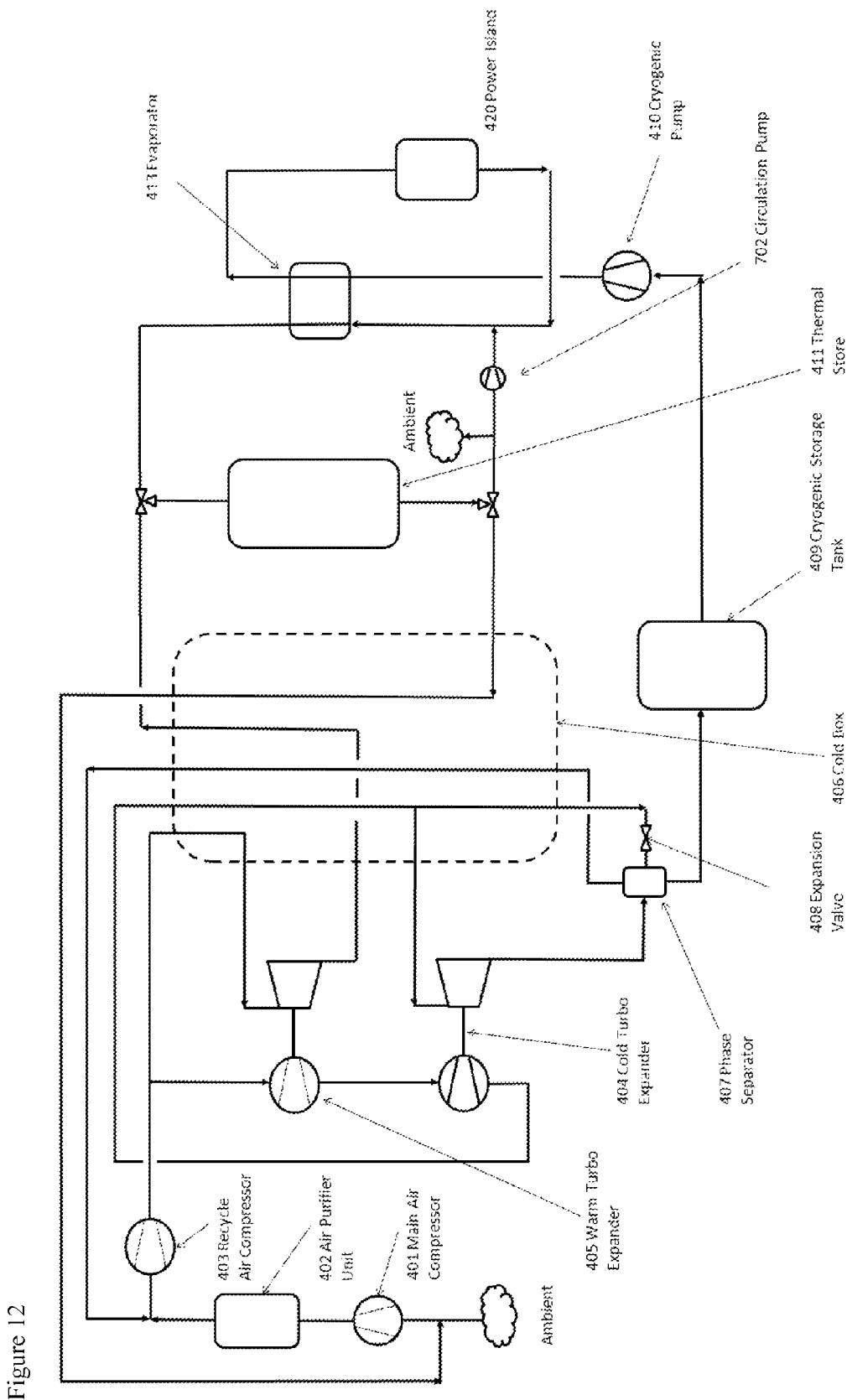
FIG. 12 shows an eighth embodiment of the current invention.

A further embodiment is shown in FIG. 12, which is the same as the embodiment of FIG. 7, except that a proportion of an exhaust stream from the thermal store outlet 411 is recirculated to pass through the evaporator 413 for a second time. Whilst this modification is shown in the context of FIG. 7, it could be used in any of the embodiments shown in FIGS. 8 to 11, or those disclosed hereafter.

The recirculation increases the flow rate of the fluid passing through the evaporator 413 to a level sufficient to capture all the cold thermal energy from the high pressure cold stream of cryogen. Accordingly, the modification negates the requirement for the medium grade cold store, 701, shown FIG. 8.

By increasing the flow rate of the exhaust stream passing through evaporator 413 (which is typically at a pressure of 1 bar), the enthalpy required to cool the stream from 10° C. to −170° C., for example, can be matched to the enthalpy released in heating the cryogen in the high pressure stream from −170° C. to 10° C. As explained above, this enables substantially all of the cold energy to be captured in evaporator 413 by the low pressure stream.

The recirculated air mass flow rate is typically between 0.5 and 1 times the exhaust stream flow, and more commonly ~0.8 when the liquid stream is pumped to 100 bar.

A circulation pump 702 is utilised to balance the system and ensure that the exhaust stream flow rate is sufficiently high whilst the turbine back pressure is unaffected.

This embodiment simplifies the system, removing the requirement for the medium grade cold store, main heat exchanger 703 and any secondary energy transferal medium. Among other advantages, this reduces capital costs.

Figure 13:
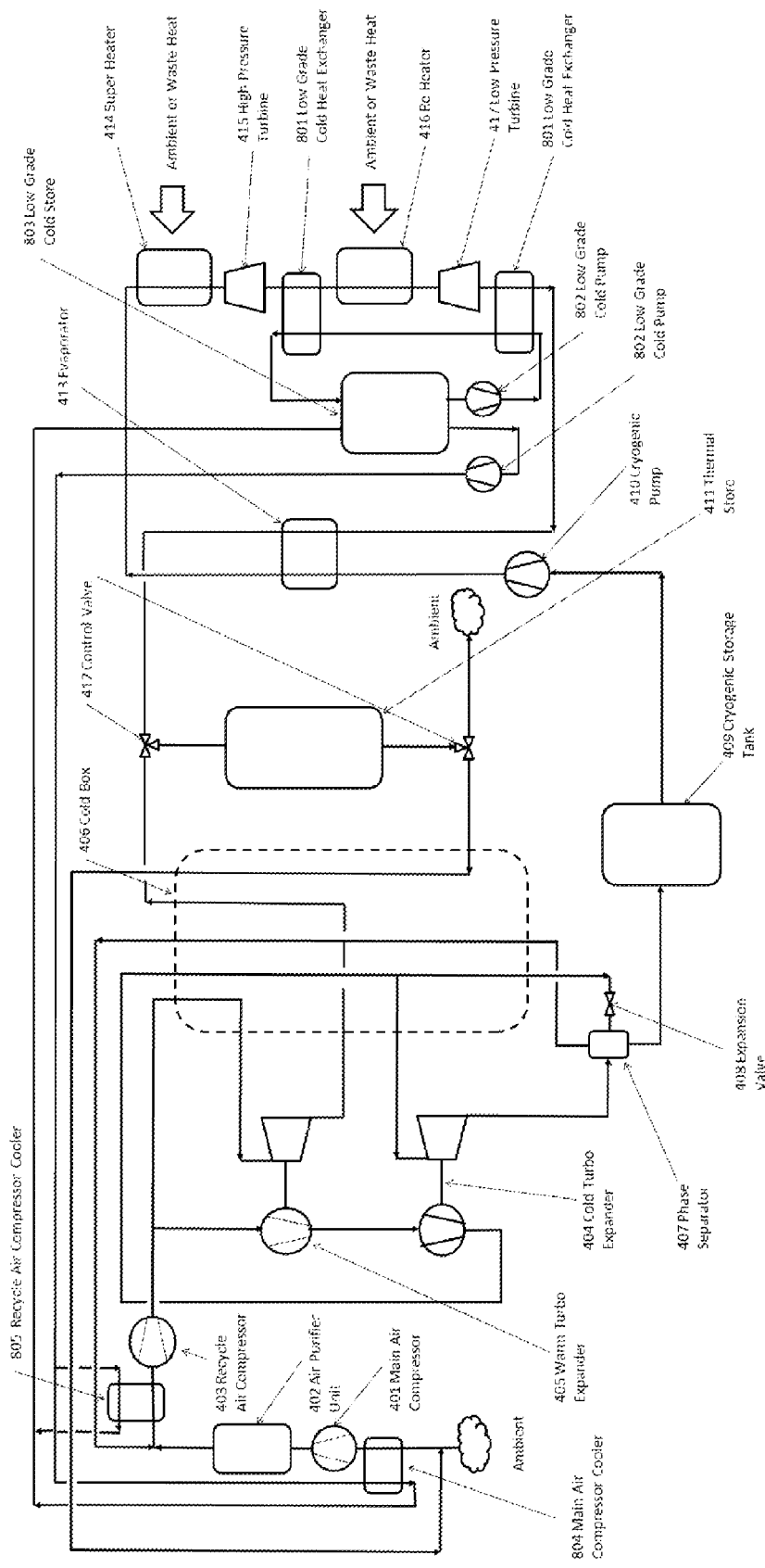
FIG. 13 shows a ninth embodiment of the current invention.

A further embodiment is shown in FIG. 13. This embodiment is the same as that shown in FIG. 7, except that a low grade thermal store 803 has been added to the system. The low grade thermal store could be used with any of the aforementioned embodiments.

Low grade cold, typically between 0° C. and −20° C., is produced in the expansion of the stream at the outlet of each turbine stage. The low grade cold thermal energy is captured by low grade exchangers 801. The low grade exchanger 801 can be simple shell and tube, plate fin or similar heat exchanger. In the embodiment of FIG. 13, two low grade exchangers 801 are shown, each located at the outlet stream of a turbine stage. However, more or fewer low grade exchangers 801 could be used. For example, the power island may include any number of turbine stages, and a low grade exchanger 801 may be provided for each turbine stage, or for only some of the turbine stages.

A low grade cold pump 802 circulates a heat transfer fluid from the low grade heat exchangers 801 to the low grade thermal store 803 during the discharge phase of the energy storage system. The heat transfer fluid is typically a glycol water mix, although other fluids such as air, or refrigerant gases could be used.

During the charging phase of the energy storage system, a second low grade cold pump 802 circulates the heat transfer fluid from the low grade thermal store 803 to both the recycle and main air compressor coolers (805, 804), whereby it is used to pre-cool the compressor inlet streams. The recycle and main air compressor coolers 805, 804 can be simple shell and tube, plate fin or similar heat exchangers.

The inventors have found that by reducing the temperature of the compressor inlet stream, the gas becomes more dense and the necessary work to compress the gas per unit is reduced. The inventors have noted that in the charging phase, the bulk of the necessary work is done by the Recycle Air Compressor 403 and Main Air Compressor 401 in compressing the gas, therefore any reduction in the necessary work carried out by these compressors has a significant effect on the work done by the system.

It will be appreciated that whilst the embodiment of FIG. 13 shows the low grade cold thermal energy being used to pre-cool the Recycle Air Compressor 403 and Main Air Compressor 401, it could be used to pre-cool just one of these compressors, or any number of different compressor. For example, one or more compressor coolers could be provided for the booster compressors 404, 405, driven by the warm and cold expander turbines.

Figure 14:
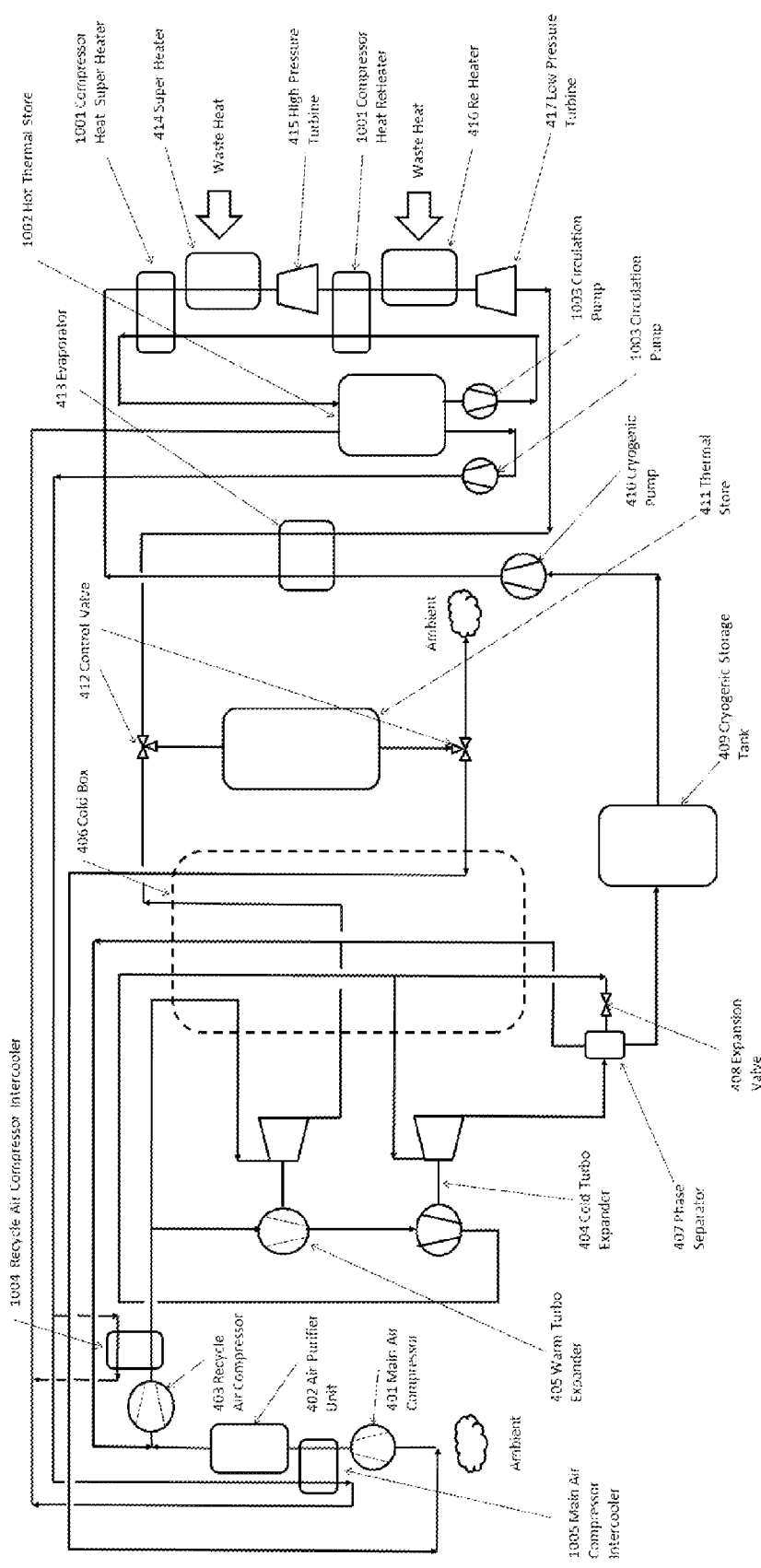
FIG. 14 shows a tenth embodiment of the current invention.

A further embodiment is shown in FIG. 14. This embodiment is similar to the embodiment shown in FIG. 13, but instead of capturing cold thermal energy from the power unit and using it to improve the efficiency of the liquefier, the embodiment in FIG. 14 effectively operates in reverse.

Again, the embodiment of FIG. 14 is the same as that shown in FIG. 7, except that a hot thermal store 1002 has been added to the system. The hot thermal store could be used with any of the aforementioned embodiments Thermal energy, typically of temperature 60° C. to 90° C. is produced in the outlet streams of both the recycle and main compressors (1004, 1005). The thermal energy is captured by compressor intercoolers, stored in the Hot Thermal Store 1002, and discharged to provide superheating to each of the turbine stage inlet streams via Compressor Heat Super Heaters 1001.

In the embodiment of FIG. 14, two compressor heater super heaters are shown, each located at the inlet stream of a turbine stage. However, more or fewer superheaters could be used. For example, the power island may include any number of turbine stages, and a superheater may be provided for each turbine stage, or for only some of the turbine stages.

Moreover, it will be appreciated that whilst the embodiment of FIG. 14 shows the compressor intercoolers on each of the Recycle Air Compressor 403 and Main Air Compressor 401, an intercooler on just one of these compressors could be used, or on any number of different compressors. For example, one or more intercoolers could be provided for the booster compressors 404, 405, driven by the warm and cold expander turbines.

A circulation pump 1003 circulates a heat transfer fluid from Compressor Intercoolers 1004, 1005 to the Hot Thermal Store 1002 during the energy store charge phase. The heat transfer fluid is typically a glycol water mix, although other fluids such as air, or refrigerant gases could be used. The Compressor Intercoolers 1004, 1005 can be a simple shell and tube, plate fin or similar heat exchanger.

During the discharging phase of the energy storage system, a second pump 1003 circulates the heat transfer fluid from the Hot Thermal Store 1002 to the Compressor Heat Super Heaters 1001, super heating the inter stage turbine process stream.

The inventors have found that the use of waste heat to superheat the turbine stream is an effective way of increasing the output from the Power Island, 420 with no added operational cost. Capturing the compressor heat allows the energy storage system to operate independently of sources of external waste heat to achieve higher efficiencies.

The inventors have discovered that in most energy storage applications and markets, the rate of charging of the thermal stores and the rate of discharge of the thermal stores are often substantially different. This is because the time where energy prices are at a peak and the system is in discharge mode are considerably shorter than the times when energy prices are low and the device can be in charging mode. It is advantageous to use as much of the available charging time as possible as a smaller, cheaper charging system can be built. The consequence of this discovery is the rate of energy flow in and out of the thermal stores is substantially different between charging and discharge. All the embodiments of the current invention described above benefit significantly from the use of high grade and/or medium grade cold of a variable geometry design, as described in GB1013578.8. In particular, the or each thermal store may consist of a first thermal mass, a second thermal mass, and a third thermal mass, wherein the aspect ratios of at least two of the first, second and third thermal masses are different to one another, and an arrangement of conduits and valves configured to direct a heat transfer fluid to pass through a combination of one or more of the thermal masses. Alternatively, the or each thermal store may comprise a first thermal mass comprising solid particles, a second thermal mass comprising solid particles, a third thermal mass comprising solid particles, wherein the diameter of the particles in at least two of the first, second and third thermal masses are different to one another, and an arrangement of conduits and valves configured to direct a heat transfer fluid to pass through a combination of one or more of the thermal masses.

It will of course be understood that the present invention has been described by way of example, and that modifications of detail can be made within the scope of the invention as defined by the following claims.

The invention claimed is:

1. A cryogenic energy storage system comprising:
a cryogenic storage tank for storing a cryogen;
a pump in fluid communication with the cryogenic storage tank for compressing the cryogen from the storage tank;
a first cold thermal store for storing cold thermal energy having a first pathway therethrough for conveying a first heat transfer fluid;
the first pathway extending through the first cold thermal store between an input end and an output end;
a power recovery system including a first heat exchanger having:
 a second pathway therethrough for conveying the first heat transfer fluid from the output end of the first pathway through the first heat exchanger to the input end of the first pathway, whereby a first closed loop circulation of the heat transfer fluid is provided through both the first cold thermal store and the first heat exchanger, and
 a third pathway therethrough for conveying the compressed cryogen through the first heat exchanger to transfer cold thermal energy from the compressed cryogen to the first heat transfer fluid;
the power recovery system further including one or more expansion turbines for expanding the cryogen conveyed by the third pathway to generate power;
a co-located liquefier including a second heat exchanger having:
 a fourth pathway therethrough for conveying the first heat transfer fluid from the output end of the first pathway through the second heat exchanger to the input end of the first pathway, whereby a second closed loop circulation of the heat transfer fluid is provided through both the first cold thermal store and the second heat exchanger, and
 a fifth pathway therethrough for conveying a first working fluid through the second heat exchanger to transfer cold thermal energy from the first heat transfer fluid to the first working fluid for contributing to converting the first working fluid into new cryogen; and
the co-located liquefier further including a sixth pathway for conveying the new cryogen to the cryogenic storage tank;
a control valve that controls flows of the first heat transfer fluid between the second and fourth pathways and the first pathway to control the first and second closed loop circulations of the first heat transfer fluid through the first cold thermal store and one or both of the first and second heat exchangers; and
a circulation pump located along the first pathway and operating in conjunction with the control valve for circulating the first heat transfer fluid along the first pathway through the first cold thermal store as well as from the output end of the first pathway along one or both of the second and fourth pathways that return the first heat transfer fluid to the input end of the first pathway.

2. The cryogenic energy storage system of claim 1, wherein the first heat transfer fluid is conveyed at a gauge pressure of less than 4 bar.

3. The cryogenic energy storage system of claim 1, wherein the control valve controls (a) the first closed loop circulation through both the first cold thermal store and the first heat exchanger and (b) the second closed loop circulation through both the first cold thermal store and the second heat exchanger.

4. The cryogenic energy storage system of claim 1, wherein a portion of the first pathway between the first cold thermal store and the output end of the first pathway provides for conveying at least a portion of the first heat transfer fluid from the first cold thermal store to the second and fourth pathways, and the control valve provides a connection from the second and fourth pathways to the input end of the first pathway for conveying the first heat transfer fluid to the first cold thermal store.

5. The cryogenic energy storage system of claim 1, wherein the second heat exchanger comprises one element of a cold box within the liquefier.

6. The cryogenic energy storage system of claim 1, wherein the first heat transfer fluid is a gaseous fluid.

7. The cryogenic energy storage system of claim 6, wherein the first heat transfer fluid is dry air, or dry nitrogen.

8. The cryogenic energy storage system of claim 1, wherein the first heat transfer fluid is a liquid.

9. The cryogenic energy storage system of claim 8, wherein the first heat transfer fluid comprises methane, methanol, propanol or propane or a water-glycol mix.

10. The cryogenic energy storage system of claim 1, wherein the cryogen comprises liquid air.

11. The cryogenic energy storage system of claim 1, wherein the co-located liquefier includes an air compressor.

12. The cryogenic energy storage system of claim 1, wherein the first cold thermal store has a variable geometry design.

13. The cryogenic energy storage system of claim 1, wherein the first cold thermal store comprises a containment vessel containing a storage media, wherein the first pathway is such that the first heat transfer fluid is in direct contact with the storage media.

* * * * *